(No Model.)
R. M. & T. E. TULL.
PUNCH.
No. 422,666.   Patented Mar. 4, 1890.
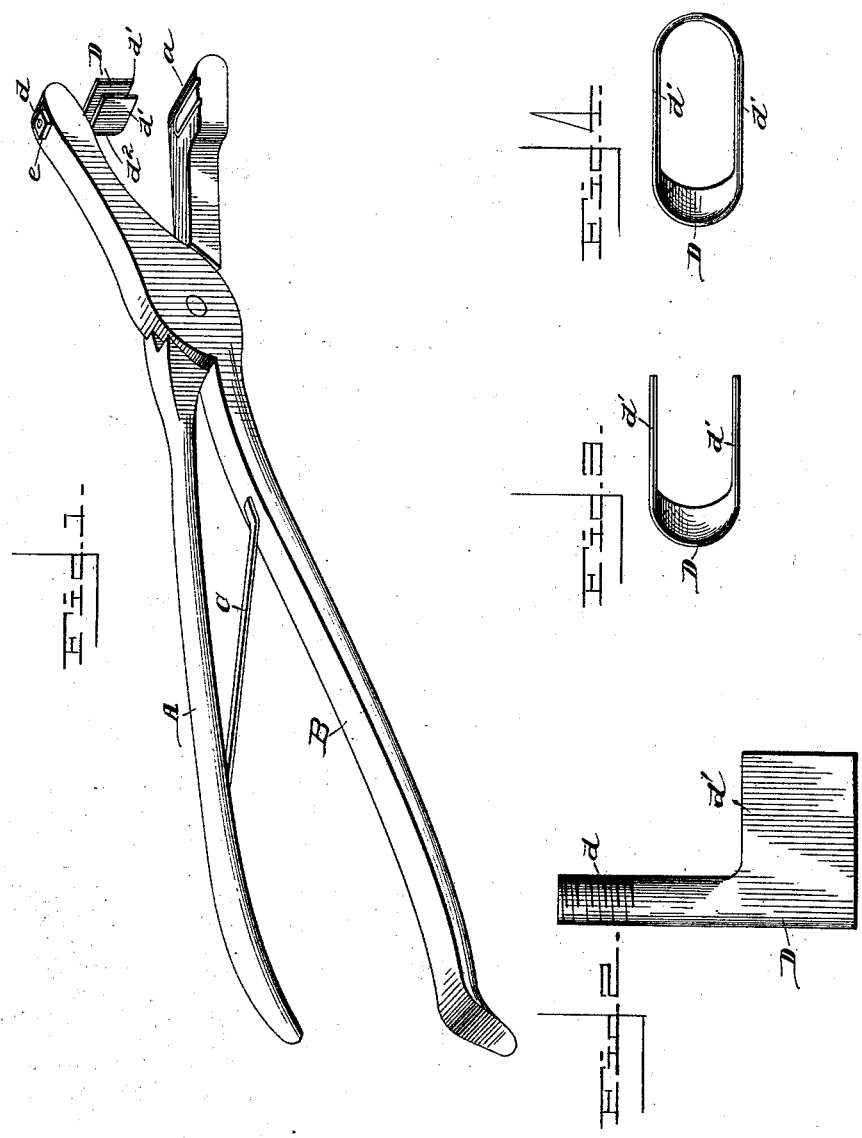
WITNESSES
Walter H. Pumphrey
Van Buren Hillyard
INVENTOR
Robert M. Tull
Thomas Ephraim Tull
By their Attorneys

UNITED STATES PATENT OFFICE.

ROBERT MERROW TULL AND THOMAS EPHRAIM TULL, OF WINDSOR, ILLINOIS.

PUNCH.

SPECIFICATION forming part of Letters Patent No. 422,666, dated March 4, 1890.

Application filed June 27, 1889. Serial No. 315,707. (No model.)

*To all whom it may concern:*

Be it known that we, ROBERT MERROW TULL and THOMAS EPHRAIM TULL, citizens of the United States, residing at Windsor, in the county of Shelby and State of Illinois, have invented certain new and useful Improvements in Punches; and we do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to harness-tools, and has for its object to devise a tool for cutting the slots in straps for the insertion of the tongues of buckles.

The improvement consists of the novel features which will be hereinafter more fully described and claimed, and which are shown in the annexed drawings, in which—

Figure 1 is a perspective view of a tool embodying our invention. Fig. 2 is a side view of the cutter. Fig. 3 is a bottom plan view of the cutter; Fig. 4, a modified form of cutter, showing both ends closed.

The tool is composed of the two levers A and B, which are pivoted together near their front ends, which ends are normally held separated by a spring, as C, which is for convenience placed between the rear ends of the levers. The lever A is expanded laterally at its front end to form a bed $a$ for the cutter D, which is carried by the lever B, being held thereto by the threaded shank $d$, which passes through an opening in said lever, and the nut $e$, screwed on the said shank $d$. The cutter is oblong and comprises two parallel sides $d$ and an end $d^2$, which closes the space between the sides at one end. In some instances it might be advisable to close the sides $d$ at both ends, as shown in Fig. 4. The bed $a$ is channeled to correspond with the form of cutter, thereby facilitating the operation of the tool.

In practice the strap to be cut is doubled and the folded end is placed between the bed and the cutter and the rear ends of the levers operated to force the cutter through the strap to form the slot.

Having thus described our invention, what we claim, and desire to secure by Letters Patent, is—

The hereinbefore-specified harness-tool for cutting slots in straps, composed of two levers A and B, which are pivotally connected together near their front ends, the levers A being extended laterally parallel with the pivot at its front end to form a bed for the cutter and the lever B being apertured, the cutter having parallel sides also parallel with the pivot and a closed end and having a threaded shank which is inserted in the opening in lever B, and the nut screwed on the projecting end of the said shank, substantially as set forth, for the purpose specified.

In testimony whereof we affix our signatures in presence of two witnesses.

ROBERT MERROW TULL.
THOMAS EPHRAIM TULL.

Witnesses:
AARON McVAY,
JAMES ERWIN.